United States Patent
Broadway et al.

(10) Patent No.: US 6,503,856 B1
(45) Date of Patent: Jan. 7, 2003

(54) CARBON FIBER SHEET MATERIALS AND METHODS OF MAKING AND USING THE SAME

(75) Inventors: Andrew Broadway, Anderson, SC (US); Gordon L. Brown, Jr., Anderson, SC (US); David Brian Barr, Greer, SC (US)

(73) Assignees: Hexcel Corporation, Dublin, CA (US); Clark-Schwebel Tech-Fab Company, Anderson, SC (US)

( * ) Notice: Subject to any disclaimer, the term of this patent is extended or adjusted under 35 U.S.C. 154(b) by 116 days.

(21) Appl. No.: 09/730,283

(22) Filed: Dec. 5, 2000

(51) Int. Cl.[7] .............................. D04H 3/00; D04H 1/00; B32B 5/26; D03D 19/00
(52) U.S. Cl. .................. 442/366; 442/343; 442/354; 442/355; 442/381; 442/367; 442/368; 442/400; 442/35; 442/268; 442/36
(58) Field of Search .............................. 442/366, 1, 367, 442/268, 368, 35, 400, 36, 343, 354–55, 381; 428/900, 411.1–704

(56) References Cited

U.S. PATENT DOCUMENTS

| | | | |
|---|---|---|---|
| 3,769,144 A | | 10/1973 | Economy et al. |
| 3,829,327 A | | 8/1974 | Omori et al. |
| 4,217,386 A | | 8/1980 | Arons et al. |
| 4,374,906 A | | 2/1983 | Breault et al. |
| 4,460,633 A | * | 7/1984 | Kobayashi et al. ......... 428/110 |
| 4,588,538 A | | 5/1986 | Chung et al. |
| 4,830,938 A | | 5/1989 | McCullough et al. |
| 4,865,931 A | | 9/1989 | McCullough et al. |
| 4,929,521 A | | 5/1990 | Cipriano et al. |
| 4,952,466 A | | 8/1990 | Cipriano et al. |
| 5,340,670 A | | 8/1994 | Takami et al. |
| 5,348,823 A | | 9/1994 | Caillon et al. |
| 5,368,913 A | | 11/1994 | Ortega |
| 5,415,959 A | | 5/1995 | Pyszczek et al. |
| 5,518,836 A | | 5/1996 | McCullough |
| 5,532,083 A | | 7/1996 | McCullough |
| 5,677,084 A | | 10/1997 | Tsukamoto et al. |
| 5,879,807 A | | 3/1999 | Inoue et al. |
| 6,054,205 A | | 4/2000 | Newman et al. |
| 6,096,669 A | * | 8/2000 | Colegrove et al. .......... 442/366 |
| 6,107,222 A | * | 8/2000 | Joseph et al. ................ 442/412 |
| 6,238,761 B1 | * | 5/2001 | Jeong et al. ................ 428/41.8 |
| 6,323,145 B1 | * | 11/2001 | Popper et al. ............... 442/366 |

FOREIGN PATENT DOCUMENTS

| | | | |
|---|---|---|---|
| EP | 0878290 A2 | * | 11/1998 |
| EP | 0 878 290 A2 | | 11/1998 |
| GB | 2 173 828 A | | 10/1986 |
| GB | 2173828 A | * | 10/1986 |

OTHER PUBLICATIONS

Nonwovens Industry (Feb. 1989), p. 6, "Air Products Making Nonwovens for Composites".
Graflok: Unidirectional Carbon Fiber Reinforcement, Nonwovens Rep. Int., (1987), No. 201, Dec. 1987, pp. 6–7.

* cited by examiner

*Primary Examiner*—Cheryl A. Juska
*Assistant Examiner*—Lynda Salvatore
(74) *Attorney, Agent, or Firm*—Alston & Bird LLP (57) ABSTRACT

Carbon fiber sheet materials having improved dimensional stability and ease of handling are provided. The sheet materials include a carbon fiber network and an adhesive polymeric material adhered to at least one surface of the carbon fiber network. The invention further provides methods of making the carbon fiber sheet materials, as well as electrodes and electrical energy storage devices which include the carbon fiber sheet material as a component thereof.

16 Claims, 4 Drawing Sheets

CARBON FIBER SHEET MATERIALS AND METHODS OF MAKING AND USING THE SAME

FIELD OF THE INVENTION

The invention relates to carbon fiber sheet materials and methods of making and using the same. More particularly, the invention relates to carbon fiber structures formed of substantially parallel carbon fibers and having an adhesive polymeric material adhered directly onto one or more surfaces thereof, which structures are useful as electrodes in electrical energy storage devices.

BACKGROUND OF THE INVENTION

Carbonaceous materials, such as those derived from pitch or polyacrylonitrile (PAN), can be used as an electrode material in electrical energy storage devices. For example, carbon can be used as a component of the electrode in primary batteries, primary fuel cells, secondary fuel cells, secondary batteries and capacitors. The carbon material functions as a current collector and/or as a reactive material to form new compounds which have different structures and properties than the original carbon material, and most recently, as semiconductor materials which form salts with ions of the electrolyte. Examples of carbon fiber based electrodes and batteries incorporating the same as a component are described, for example, in U.S. Pat. Nos. 4,865,931; 5,518,836; 4,830,938; 4,952,466; and 4,929,521.

In general, the batteries include electrodes formed of electrically conductive carbon fibers. The carbon fiber electrodes are placed in a suitable housing in contact with an electrolyte, typically an ionizable salt in a nonaqueous fluid. The electrodes are separated from one another in the housing to prevent short circuiting between the electrodes while allowing ions to travel between the electrodes. Typically the electrodes are separated from one another by materials that are separate and discrete from the individual electrodes. Examples of separators described in the art include sheets of fiberglass, nonwoven polymeric sheets or webs, coated metallic screens, porous films, and spacers (such as polymeric beads) extending between the electrodes.

Such batteries can offer an attractive alternative to traditional lead-acid reduction-oxidation batteries. For example, batteries including a carbon fiber based electrode can generate high power, and are generally efficient, compact, and non-toxic. However, there are difficulties associated with the production of carbon fiber based electrodes. It can be difficult to handle the carbon fiber assemblies, particularly on a commercial production scale. Carbon fiber assemblies, particularly those prepared from carbon fiber tows, have limited dimensional stability and are difficult to handle without touching and compromising the carbon fiber surface. This in turn can slow fabrication times in manufacturing the batteries and limit the reasonably expected quality and performance of batteries and components. Yet traditional techniques for stabilizing fibrous assemblies in the textile art are not readily translated into the production of carbon fiber assemblies for battery applications.

For example, carbon fiber tows have been impregnated with resin to form prepreg tapes and rovings. However, the impregnating resin would be expected to interfere with the electrical performance of the electrode. Also, impregnating a carbon fiber tow with resin would reduce the available surface area of the carbon fibers, which can also comprise performance in battery applications.

Woven and/or knit carbon fiber assemblies are typically more dimensionally stable than a fiber tow. However, it can be difficult to weave or knit carbon fibers without a size on the fiber surfaces because of the inherent stiffness and brittle nature of these fibers. The size, however, can be difficult to remove from the woven and/or knit assembly. If left on the fibers, the sizing can interfere with the electrical performance of the carbon fiber electrode. Still further, woven and knit carbon fiber assemblies can have significantly reduced percent surface area available for interaction with the electrolyte solution. Also, the surface geometry of a knit or woven fabric is irregular, which can cause electrical inefficiencies because ions will transfer preferentially to the high peaks of the fabric.

SUMMARY OF THE INVENTION

The present invention provides carbon fiber sheet materials, which are useful for a variety of applications, including use as electrodes in electrical energy storage devices. The carbon fiber sheets of the invention include a network formed of a plurality of carbon fibers or filaments, arranged substantially parallel relative to one another. To provide improved dimensional stability and ease of handling, the carbon fiber networks include an adhesive polymeric material adhered directly onto one, and preferably both, surfaces of the carbon fiber network as an integral part of the carbon fiber network. The adhesive polymeric material is in the form of a porous or permeable layer so as to allow the passage of ions therethrough and into contact with the carbon fiber network. Advantageously the adhesive layer can be releasably adhered to the surface of the carbon fiber network.

In one advantageous embodiment of the invention, the adhesive polymeric material is a melt blown web which is melt blown and adhered directly onto one or more surfaces of the carbon fiber network. However, the adhesive material can also be present in other forms, such as but not limited to, other types of fibrous webs (such as spunbonded webs), microporous films, a discontinuous pattern of adhesive, and the like.

Despite the presence of the adhesive on a surface of the carbon fibers, the electrical performance of the carbon fibers as an electrode is not significantly compromised. In this regard, the adhesive material is applied so that only a small percentage of the carbon fiber surface is used or contacted by the adhesive. This in turn allows ions to be less restricted in their movement.

The resultant stabilized carbon fiber assemblies can be more readily handled, particularly when fabricating batteries, thus reducing production times and costs. Further, the carbon fiber networks of the invention can provide cost benefits by providing an integral separator/carbon fiber electrode assembly, in contrast to conventional separators, which are discrete and separate from the electrode.

The carbon fiber network can be a woven, knit or nonwoven substrate. In one advantageous embodiment of the invention, the carbon fiber network is formed from one or more tows or bundles of carbon fibers. Preferably the fibers of the tow(s) are spread out relative to one another to form a substantially planar sheet prior to applying the adhesive layer web to a surface thereof. The added flexibility in production provided by stabilizing the tow with the adhesive layer is particularly advantageous because spreading the fibers of the tow to form a planar sheet increases the surface area available for interaction with the electrolyte solution.

This also has the advantage of improving control of the uniformity of the tow thickness across the width and length dimensions thereof. As a result, carbon fiber sheet materials can be manufactured that have a substantially uniform thickness. This in turn can be particularly advantageous for battery performance. In this regard, battery performance is related at least in part to providing a substantially uniform or homogeneous ratio of electrolyte mass to carbon fiber mass. Thus battery performance can be improved by minimizing inconsistencies in the distances between fibers, and thus the distances required for ions to travel between carbon fibers.

In another embodiment of the invention, the carbon fiber structure is a woven or nonwoven web formed of intersecting transverse (weft) yarns and longitudinal (warp) yarns. The warp yarns are formed of carbon fibers or filaments and can be mono-filament or multifilament yarns. Preferably the weft yarns are thermoplastic, polymer coated fiberglass yarns, and more preferably polyolefin coated fiberglass yarns, such as polypropylene coated fiberglass yarns. Alternatively, the weft yarns can be formed of a thermoplastic material, such as an amorphous (or atactic) polyolefin. The thermoplastic polymer coated yarns and/or thermoplastic polymer yarns can also be multifilament or monofilament yarns. The thermoplastic polymer coated weft yarns and/or thermoplastic polymer weft yarns can further improve the dimensional stability of the assembly by providing additional bonding with the adjacent adhesive layer.

Preferably the adhesive layer is formed of an adhesive material that is capable of being fiberized, i.e., being formed into a fibrous structure. The adhesives can be thermoplastic or thermoset adhesives. Particularly preferred adhesives include polyolefins, and more preferably amorphous (i.e., atactic) polypropylene polymers. The basis weight of the adhesive layer can vary, and generally ranges from about 1 to about 100 grams per square meter (gsm), depending upon a variety of factors, such as the specifics of the carbon fiber network structure, end use of the product, and the like. Basis weights outside of this range can also be used. In one advantageous embodiment, the adhesive layer is a melt blown web having a relatively small basis weight, from about 1 to about 35 gsm, although webs having a basis weight outside this range can also be used. Thus low basis weight materials can be successfully integrated with the carbon fibers to form a unitary carbon fiber network to provide the benefit of insulating the carbon fiber layers without high material costs. The porous or permeable adhesive layer also can stabilize the carbon fiber network and improve ease of handling.

In one particularly advantageous embodiment of the invention, the carbon fiber assemblies have porous or permeable adhesive layers, preferably in the form of melt blown webs, on opposing surfaces of the carbon fiber sheet. In this embodiment of the invention, the adhesive layers can extend beyond at least one, preferably two, and more preferably three, of the peripheral edges of the carbon fiber sheet. A portion of the adhesive layers extending beyond the edge of the carbon fibers can be treated under conditions sufficient, for example by application of heat and optionally pressure, to form a bond or selvage edge to the assembly. This in turn can provide a "bag" encapsulating the carbon fibers, thus further improving dimensional stability and ease of handling. For carbon fiber tows, this has the additional advantage of allowing the carbon fibers to spread out more readily without compromising handling or stability and increasing carbon fiber surface area available for interaction with the electrolyte solution.

A selvage edge can be prepared using other techniques as well. For example, the selvage edge can be prepared mechanically (for example, by applying pressure without significant heat), chemically (for example, using a plasticizer to soften the material), and the like. Preferably at least one edge of the carbon fiber network remains exposed, or is readily exposed, so as to allow ready attachment of electrodes.

In addition, the adhesive layers, particularly melt blown web(s), can be readily applied under conditions to control thickness, porosity, and the like. For example, the adhesive layer may be applied as a single layer. Alternatively the adhesive layer can be applied as two or more multiple layers, which can have the same or different basis weights, thickness, fiber size, etc. In this aspect of the invention, advantageously two or more melt blown adhesive webs are used and include a layer of large diameter melt blown fibers (generally from about 20 to about 200 microns) applied initially to the carbon fiber structure, followed by a layer of smaller diameter melt blown fibers (from about 1 to about 75 microns). The resultant continuum of fiber sizes provides a variable porosity through the cross section of the web, thus allowing passage of ions for interaction with the carbon fibers, yet also preventing penetration of the web by carbon fibers. In addition, the larger diameter melt blown fibers can stick or adhere to the surface of the carbon fiber better than smaller diameter fibers. Still further, spraying the fiberized adhesive on opposing surfaces of the carbon fiber network can permit the formation of a naturally bonded edge, which in turn provides stability and protection without necessarily requiring a subsequent edge treatment.

The carbon fiber assemblies can further include one or more additional layers positioned so as to sandwich the adhesive layer between the additional layer and the carbon fiber network. Examples of additional layers include without limitation mesh scrims, nonwoven fabrics, such as spun-bonded fabrics, and the like.

In one useful embodiment of the invention, the additional layer is a scrim material constructed using thermoplastic polymer coated yarns (preferably polyolefin coated fiberglass yarns, such as polypropylene coated glass yarns) and/or thermoplastic yarns. In this aspect of the invention, the scrim can be a woven or nonwoven substrate, such that the thermoplastic polymer coated yarns and/or other thermoplastic yarns are held into place mechanically. Alternatively, the scrim can be a nonwoven substrate in which the thermoplastic polymer coated yarns and/or other thermoplastic polymer yarns are adhesively bonded, for example by application of heat at the yarn contact or cross over points. Woven and nonwoven substrates in which yarns are held into place mechanically can include adhesive bonding at fiber cross over points as well.

The additional layer, such as a scrim material, can be bonded to the carbon fiber assembly via the adhesive layer of the carbon fiber assembly. For example, heat and optionally pressure can be applied to the carbon fiber assembly prior to or concurrently with directing the scrim into a face-to-face relationship with the adhesive layer. The use of woven or nonwoven scrims formed of thermoplastic polymer coated yarns and/or thermoplastic yarns provides the added benefit of still further improved bonding with the adhesive layer.

The additional layer(s) (such as a scrim) can also extend beyond one, preferably two, and more preferably three, edges of the assembly and the resultant assembly treated to form a selvage edge or seam as described above. For example, the selvage edge can be formed by applying heat and optionally pressure to the structure, which is particularly useful for those embodiments in which the additional layer (s) are scrims formed of polyolefin coated yarns and/or other thermoplastic yarns.

Advantageously, the carbon fiber network can include an adhesive layer and at least one additional layer, such as a mesh scrim as described above, on opposite sides thereof. For example, a representative carbon fiber assembly can include an open mesh scrim layer/adhesive layer/carbon fiber network/adhesive layer/open mesh scrim.

The carbon fiber assemblies of the invention can also include one or more edging materials, preferably formed of a low modulus polymer, positioned adjacent one or both longitudinal edge(s) of the carbon fiber network. The edging material can be used to control the width of the carbon fiber network, particularly for those embodiments employing carbon fiber tows. Also, such edging materials can provide additional dimensional stability to the assembly. Still further, the edging material can be selected so as to be compatible and/or have affinity with the adhesive layer so as to improve bonding of the adhesive layer to the carbon fiber assembly (for example, by selecting a polyolefin based adhesive as the adhesive layer and a polyolefin yarn or polyolefin sheathed or coated yarn as the edging material).

The present invention thus provides an insulating layer as an integral part of the carbon fiber network. In addition, an adhesive that is optionally fiberized and applied directly onto the carbon fiber network, particularly for a carbon fiber tow, can improve the cohesion and dimensional stability of the network. The adhesive layer can also provide significant adhesion with a carbon fiber substrate that includes a thermoplastic polymer coated fill yarn and/or other thermoplastic polymer fill yarn. The present invention not only provides an integral carbon fiber electrode/insulator material but also can provide a more stable, durable electrode structure. This in turn can improve ease of handling and fabrication into the desired end product, lower production costs and reduce production times.

BRIEF DESCRIPTION OF THE DRAWINGS

In the drawings which form a portion of the original disclosure of the invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

FIGS. 1A, 1B, 1C and 1D illustrate exemplary carbon fiber sheet materials in accordance with the invention. The sheet materials are particularly useful as components in electrical energy storage devices, such as but not limited to, electrodes for primary batteries, primary fuel cells, secondary fuel cells, secondary batteries and capacitors. However, the carbon fiber sheet materials of the invention can also be useful in a variety of other end uses and applications other than the battery field, such as unidirectional carbon reinforcements for composite applications, thermal management, fire insulation, and the like.

Figure 1A:
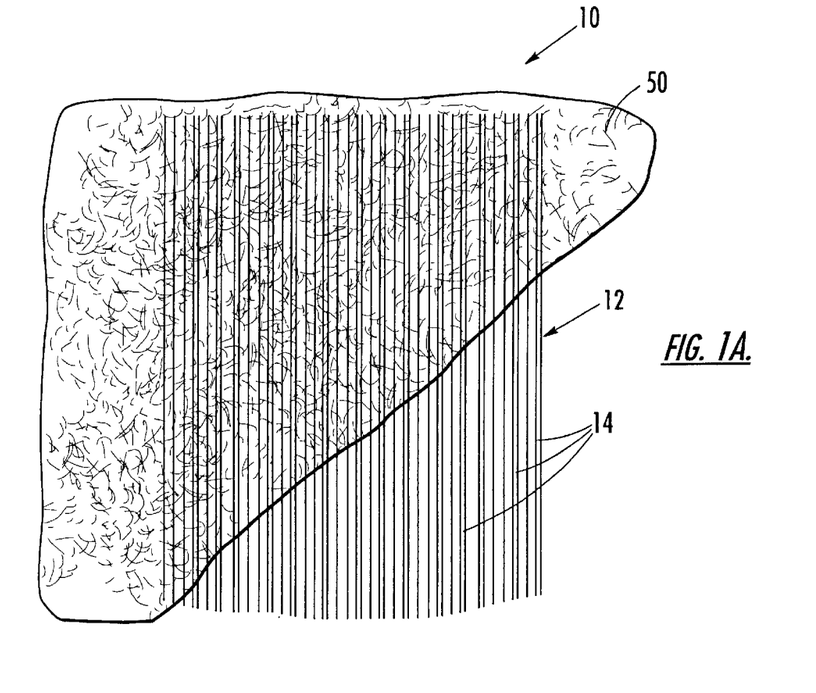
FIGS. 1A, 1B, 1C and 1D are top perspective views of exemplary carbon fiber sheet materials of the invention including a carbon fiber network and an adhesive polymer layer adhered to a surface thereof, partially cut away to illustrate the component layers thereof.

Turning first to FIG. 1A, one exemplary embodiment of a carbon fiber sheet material 10 of the invention is shown, which includes at least one layer or network 12 of a plurality of carbon fibers 14 arranged substantially parallel relative to one another. The network of carbon fibers can be a nonwoven, woven, or knit structure, and can be manufactured using any of the techniques known in the art for forming a fibrous coherent web of carbon fibers or filaments. For example, as illustrated in FIG. 1A, the carbon fiber network 12 can be a nonwoven structure including a plurality of individual carbon fibers or filaments 14 substantially uniformly aligned and spread out relative to one another to form a relatively thin planar sheet. Advantageously, the sheet of carbon fibers is substantially gap free. Such a configuration can be derived using carbon fiber tows or bundles, as discussed in more detail below.

The number of carbon filaments present in the tows can vary, depending a variety of factors including the desired end use of the product. However, typically the tows includes at least about 1000 filaments, and preferably from about 3000 to about 50,000 filaments, although tows having more or less filaments can also be useful in the present invention. The thickness of the resultant planar sheet can vary as well. Generally the thickness of the planar sheet, expressed in terms of areal density per square meter ($AD/m^2$), can range from about 50 to about 3000, preferably from about 100 to about 1500, and more preferably from about 200 to about 1000, although again, densities outside these ranges can also be used.

In addition, the carbon fiber network can have a substantially uniform thickness in the z-direction or axis across the width and length dimensions thereof. The thickness of the network can be determined conventionally, for example, by measuring the thickness of the sheet at a plurality of spaced apart locations along the length and width thereof. Fiber network thickness across the dimensions of the sheets of the invention preferably varies no more than about plus or minus 25%, and preferably no more than about plus or minus 10%.

Thus using carbon fiber tows can provide the added benefit of a product with substantially uniform thickness because there are no cross directional fibers, such as are introduced in a weaving process. Improved uniform thickness may also be attributed to the ability to spread individual carbon fiber tows. As compared to woven products, the use of carbon fiber tows can result in an increase in thickness uniformity from about 5 to about 30%.

Figure 1B:
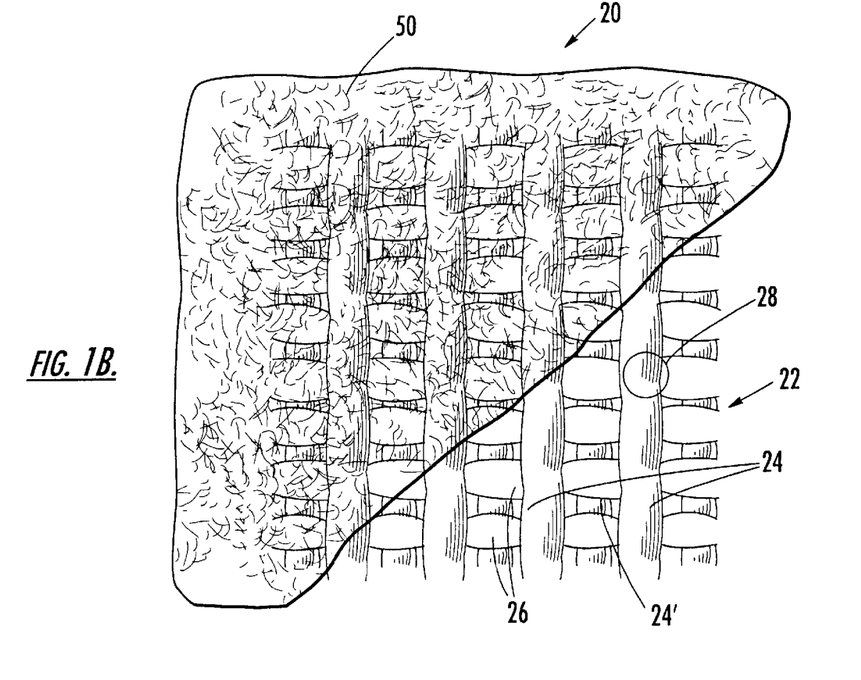
Figure 1C:
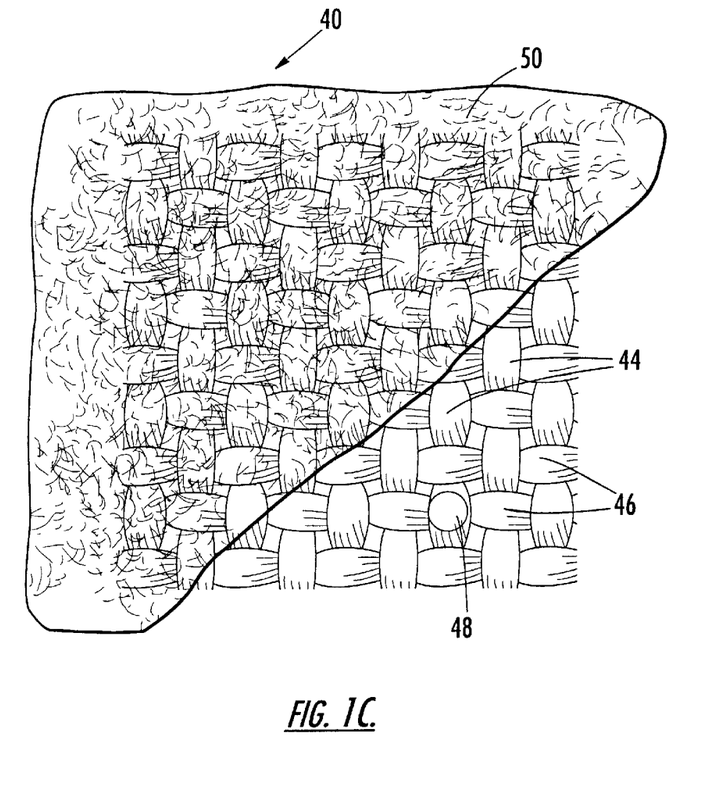

Exemplary alternative carbon fiber networks useful in the present invention are illustrated in FIGS. 1B and 1C. FIG. 1B illustrates a carbon fiber sheet material 20, which also includes a nonwoven carbon fiber network, designated as 22. In this embodiment of the invention, the carbon fiber network 22 is formed by a plurality of substantially parallel carbon fiber longitudinal yarns (warp) 24 and 24', intersecting a plurality of transverse (weft) yarns 26. In the nonwoven structure of FIG. 1B, the position of the weft yarn(s) does not change relative to a given warp end.

The warp and weft yarns can be single or multifilament yarns and can be formed of substantially continuous filaments or staple fibers, although continuous filaments are preferred. Further, weft yarns 26 can be formed of any suitable material, but typically are not also formed of carbonaceous material. Advantageously the weft yarns are polyolefin coated fiberglass yarns or thermoplastic yarns, such as those formed of an amorphous or atatic polyolefin.

Figures 2A, 2B:
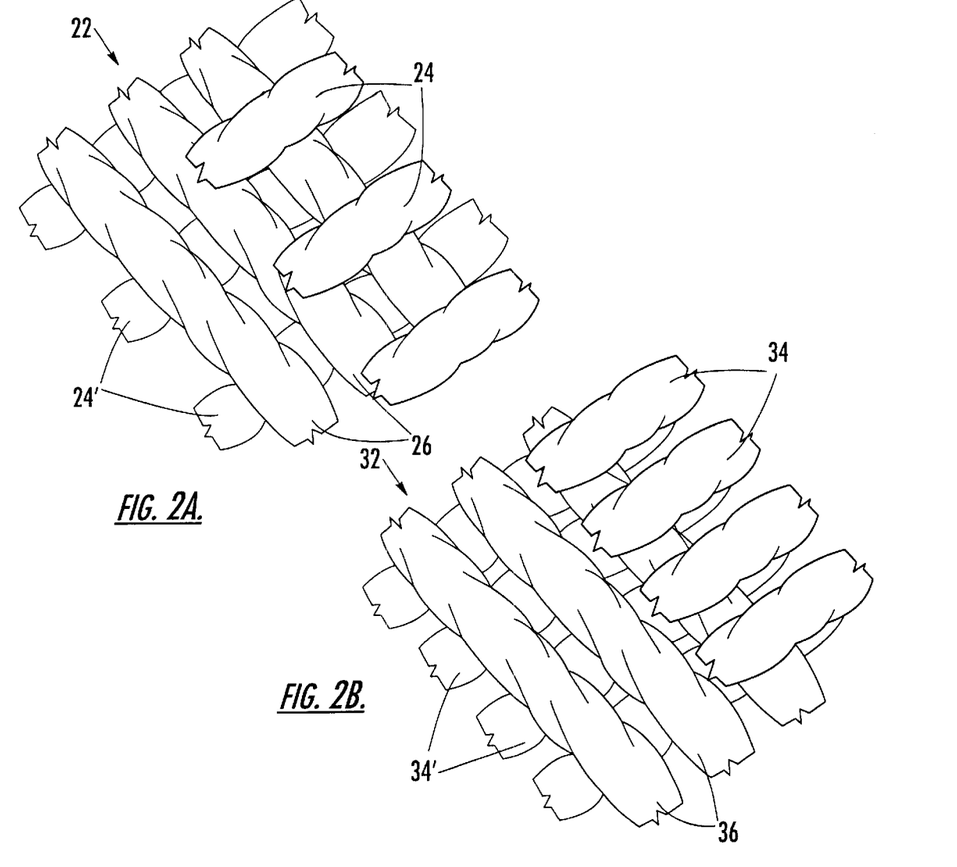
FIGS. 2A and 2B are fragmentary perspective views of alternative nonwoven carbon fiber networks useful as substrates in the present invention, partially cut away to illustrate warp and weft yarns thereof.
Figure 3A:
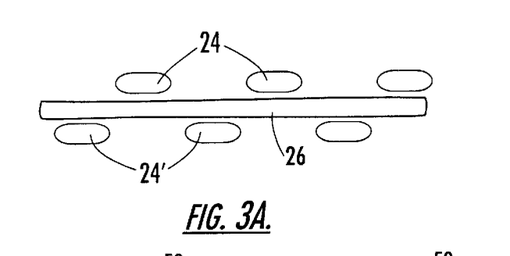
FIGS. 3A and 3B are schematic cross sectional views of the nonwoven carbon fiber networks of FIGS. 2A and 2B, respectively.

As shown in FIG. 1B, outer carbon fiber warp yarns 24 and 24' sandwich inner weft yarns 26. Further, warp yarns 24 and 24' alternate positions relative to one another. The nonwoven structure of carbon fiber network 22 is also illustrated in FIG. 2A, a perspective view of the carbon fiber network 22 of FIG. 1B, with the layers partially cut away for illustration. FIG. 3A is a schematic cross sectional view of the carbon fiber network 22 of FIGS. 1B and 2A, and illustrates the alternating positions of the warp yarns 24 and 24'.

Figure 3B:
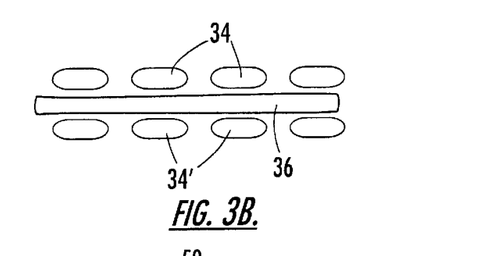

Other nonwoven carbon fiber network structures are also contemplated within the scope of the present invention. For example, FIG. 2B illustrates a top perspective view of one such alternative nonwoven carbon fiber network, designated as 32, also with the layers partially cut away for illustration. As shown in FIG. 2B, outer carbon fiber warp yarns, designated as 34 and 34', sandwich inner weft yarns 36. In contrast to the alternating construction of FIGS. 1B, 2A and 3A, carbon fiber warp yarns 34 and 34' are superimposed upon one another. See also FIG. 3B, illustrating a cross sectional view of the carbon fiber network 32 of FIG. 2B. Similar to the nonwoven fabric of FIGS. 1B, 2A and 3A, the position of the weft yarn(s) does not change relative to a given warp end.

FIG. 1C illustrates an exemplary woven carbon fiber network 40. In this embodiment, the carbon fiber network is also formed by a warp of a plurality of substantially parallel carbon fiber yarns 44, intersecting a plurality of weft yarns 46. Similar to the nonwoven embodiments described above, the warp and weft yarns can be single or multifilament yarns and can be formed of substantially continuous filaments or staple fibers, although continuous filaments are preferred. Also similar to the nonwoven embodiments discussed above, weft yarns 46 can be formed of any suitable material, so long as the yarns are not also formed of carbonaceous material, and preferably are polyolefin coated fiberglass yarns and/or thermoplastic yarns. In contrast to the nonwoven fabrics of FIGS. 1B, 2A–B and 3A–B, however, for the woven fabric of FIG. 1C, the weft yarns 46 alternate their position relative to a given warp end, thus locking in the yarns into a woven fabric structure.

In both FIGS. 1B and 1C, the intersecting carbon fiber warp yarns and weft yarns are preferably bonded at their crossover points 28 and 48, respectively, to provide dimensional stability to the carbon fiber network. Processes and apparatus for forming woven and nonwoven fabrics of carbon fibers are known in the art and can be used in accordance with the present invention. Reference is made herein to U.S. Pat. No. 4,242,779 to Curinier et al. This process involves using an apparatus for forming a web of transverse (weft) yarns for use in the network and subsequently superimposing one or more of the longitudinal (warp) yarns on each side of the web of weft yarns to form the network.

The amount of generally transverse yarns and generally longitudinal yarns may be defined by the "picks per inch" or pick count of the fabric. Preferably, the fabric has a pick count of about 20 by 20 to about 6 by 6. The networks can also be described in terms of the distance between the "center line" of the weft yarns. This distance can vary and generally ranges from about a 1" center line to center line spacing up to about a 6" center line to center line spacing. Generally, the individual yarns used to form the network can have a size ranging from about 45,000 yds/lb to about 100 yds/lb.

Although exemplary embodiments of the carbon fiber networks are illustrated and described above, the skilled artisan will appreciate that other nonwoven and woven carbon fiber structures, as well as knit carbon fiber structures, can also be used in the accordance with the present invention. Preferably the carbon fibers are substantially continuous filaments, but staple fibers can also be assembled into suitable carbon fiber networks for use in the present invention. For example, the carbon fiber network can be in the form of staple fibers layered to form a cloth, paper-like or felt-like planar member.

As used herein, the term "carbon fibers" refers generally to fibers formed of a carbonaceous material, typically obtained by heating a precursor material to a temperature sufficient to form the desired carbon fiber structure. Carbonaceous fibers are typically divided into two categories, amorphous carbon fibers and graphite fibers. For ease of reference, unless otherwise noted, the term carbon fibers as used herein refers to all carbonaceous fibers in the general sense, and includes graphite fibers as well as amorphous carbon fibers. Graphite fibers are generally defined as fibers having a carbon content of at least about 98% by weight, and have a predominant x-ray diffraction pattern characteristic of graphite. Amorphous carbon fibers are generally defined as fibers having a carbon content between about 70 to about 99% by weight, and which exhibit an essentially amorphous x-ray diffraction pattern. Preferably the carbon fibers used in the present invention have a carbon content of between about 95% to about 99.9% by weight, and are electrically conductive.

The carbon fibers can have a substantially circular or non-circular cross sectional configuration. The carbon fibers also preferably have a Young's modulus of from about 1 MM psi (6.9 Gpa) to about 120 MM psi (830 Gpa). Exemplary carbon fibers that are particularly useful in electrical energy storage devices are described for example in U.S. Pat. Nos. 4,865,931; 5,518,836; 4,830,938; 4,952,466; and 4,929,521, the disclosure of each of which is hereby incorporated by reference.

Carbon and graphite fibers can be formed by heat treatment of a suitable precursor fiber under conditions selected to provide to desired degree of stabilization. Appropriate heat treatment conditions, such as atmosphere and heating temperatures, are known in the art and can be utilized so that the carbon fiber precursor is progressively stabilized (or oxidized), carbonized to form carbon fiber, and ultimately graphitized to form graphite fiber. For example, to prepare carbon fibers useful in electrical applications, the carbon fiber precursor can be heated the precursor material to a temperature above about 1500° C. until electrically conductive.

Carbonaceous precursor starting materials capable of forming the electrically conductive oriented carbonaceous material portion of the electrode are well known and include without limitation polyacetylene, polyacrylonitrile, polyphenylene, polyvinylidene chloride, and the like as well as copolymers and terpolymers thereof. Mesophase pitch (petroleum or coal tar) can also be used. The carbonaceous precursor starting material should have some degree of skeletal orientation, i.e., many of these materials either have substantial concentrations of oriented benzenoid structural moieties or moieties which are capable of conversion, on heating, to benzenoid or equivalent skeletal orientation at or near the surface because of the skeletal orientation of the starting material.

Turning again to FIGS. 1A, 1B, 1C and 1D, in addition to the carbon fiber network, the carbon fiber sheet materials of the invention also include an adhesive layer on a surface of the carbon fibers, illustrated in FIGS. 1A–C as melt blown polymer web 50. For ease of reference, the adhesive layer will be discussed herein as a melt blown web. However the invention is not limited to the use of adhesive melt blown webs. Rather, the adhesive layer may take many different forms, including without limitation, other types of fibrous webs (such as spunbonded webs), microporous films, a discontinuous pattern of adhesive, and the like.

Figure 1D:
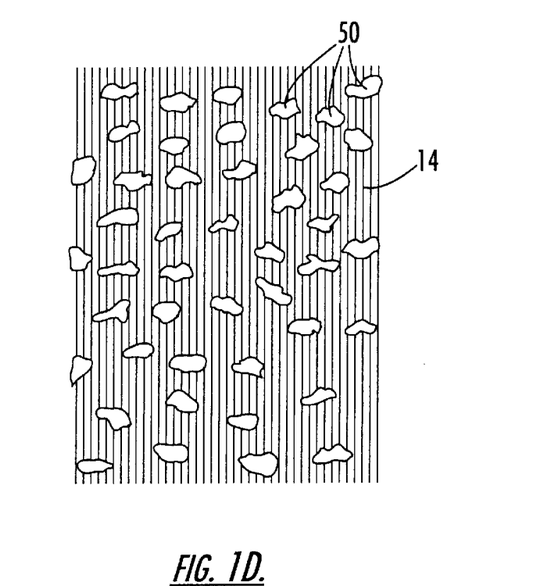

As an example, FIG. 1D illustrates a carbon fiber sheet material which includes a plurality of carbon fibers or filaments 14 aligned and spread out relative to one another, and an adhesive layer 50 on a surface thereof as a discontinuous pattern of adhesive. The pattern illustrated is a random pattern. But as will be appreciated by the skilled artisan, the adhesive pattern can be substantially uniform or random. FIG. 1D also illustrates a plurality of discrete "spots" of adhesive but as will also be appreciated, the adhesive can be applied as stripes, swirls, and the like, so long as the resultant adhesive layer is permeable.

For fibrous adhesive layers, the discrete adhesive fibers can be mono- or multicomponent fibers, including bicomponent binder fibers as known in the art. Advantageously the adhesive layer is applied using an in-line process (for example by melt blowing the adhesive directly onto the carbon fibers). However, the adhesive layer can be preformed using known techniques and subsequently adhered to the surface of the carbon fibers, for example, under conditions of heat and pressure sufficient to soften the adhesive layer and adhere it to the carbon fibers. The skilled artisan will appreciate temperatures and optionally pressure conditions useful for adhering various adhesive layers to a surface.

Returning to FIGS. 1A–C, melt blown polymer web 50 is joined to the carbon fiber network on at least one face thereof, and may be applied on both faces of the carbon fiber network. For carbon fiber networks with some opening between yarns, the melt blown polymer web covers at least a portion of the openings, and preferably a significant portion (e.g. most, if not all) of the mesh openings. The term "covers" as used in this context includes both partial and complete coverage of the mesh openings.

Preferably the adhesive does not penetrate significantly into the carbon fiber network, but rather adheres primarily to an outer surface thereof. Thus the present invention differs from processes in which a resin significantly impregnates the carbon fiber structure, e.g., impregnates the interstices of the fabric and encapsulates the individual filaments. However, some degree of penetration into the carbon fiber network can be tolerated.

The polymer web 50 is preferably composed of a plurality of randomly oriented melt blown polymer fibers. The melt blown polymer fibers preferably are formed from an adhesive polymer so that the web adheres to the face of the carbon fiber network without requiring application of a separate adhesive layer. Therefore, the polymer used for the melt blown polymer web 50 is typically a polymer which possesses a certain tackiness to the carbon surface, and/or to the weft yarn when present, at least when the fibers are at a temperature above their softening point (e.g. 350E to 400EF). Such materials include polyolefins such as polypropylene, polyethylene and amorphous poly((α-olefins); ethylene copolymers such as ethylene vinyl acetate or ethylene methacrylate copolymers, polyesters such as polyethylene terephthalate; polyamides; polyacrylates; polystyrene; styrene block copolymers; thermoplastic elastomers; mixtures thereof; and other known fiber forming thermoplastic materials. Other adhesive materials can also be used in accordance with the present invention, so long as the nature of the adhesive does not interfere with the end use of the product. For example, the adhesive could also be a thermoset material, such as but not limited to moisture curable polyurethane adhesives. Solid adhesive materials can also be used in the invention, such as but not limited to polyethylene waxes; hot melt adhesives; pressure sensitive adhesives; and the like. For many applications, the adhesive preferably is a material which can be fiberized, i.e., formed into discrete fibers or filaments.

Advantageously while the polymer material adheres to a surface of the carbon fiber network, the melt blown web can be readily removed. In this regard, the peel strength of samples having an atatic polypropylene adhesive material melt blown onto a carbon fiber network was evaluated. The adhesive melt blown fibers had diameters ranging from about 15 to 50 microns. Using a 180 degree peel testing (about 1" per second movement speed), the removal force to remove the adhesive layer from the carbon fibers can range from about 1 to about 50 grams/centimeter width (of product) without an edge webbing or selvage, and from about 6 to about 100 grams/centimeter, for samples with an edge or selvage intact. In addition, the bond area of adhesive per total surface area can be less than about 10% and more typically less than about 1% of the total surface area.

Preferably, the polymer used to form the melt blown polymer web 50 is not substantially tacky at temperatures considerably below its softening point (e.g. at room temperature) to allow sheets of the adhesive layer/carbon fiber network sheet material to be stacked and unstacked without significant adherence between a surface of the carbon fiber network of one sheet and a surface of the adhesive layer of an adjacent sheet. However, the adhesive material can be tacky at a temperature above its softening point to facilitate adhesion between the adhesive layer and the carbon fiber network. In addition, for battery applications, the material selected is an electrically non-conductive, ion permeable material. Preferred polymers include amorphous poly(α-olefin) polymers (e.g. RT-2180 from Huntsman Corp., Houston, Tex. and 8494-36G from National Starch and Chemical Co.) and polyamides (e.g. HL-6520-X from HB Fuller Co.).

The amount of melt blown fibers forming the polymer web 50 and applied to the face of the carbon fiber network is normally described in terms of basis weight, or grams of melt blown fibers per square meters of carbon fiber surface. Preferably, the basis weight of the melt blown polymer web 50 is between about 1 and 100 gsm. In one preferred embodiment, the basis weight of the melt blown polymer web 50 is from about 1 to about 35 gsm. The average size of the melt blown fibers can vary, and generally ranges from about 1 to about 200 microns, and preferably from about 5 to about 75 microns. Similar amounts of adhesive can also be used for other types of adhesive layers.

In one particularly advantageous embodiment of the invention, the carbon fiber assemblies have porous or permeable adhesive layers, preferably melt blown webs, on opposing surfaces of the carbon fiber sheet. In this embodiment of the invention, the adhesive layers can extend beyond at least one, preferably two, and more preferably three, of the peripheral edges of the carbon fiber sheet. A portion of the adhesive layers extending beyond the edge of the carbon fibers can be treated, for example by application of pressure and heat, under conditions sufficient to form a bond or selvage edge to the assembly. This in turn can provide a "bag" encapsulating the carbon fibers, thus further improving dimensional stability and ease of handling. A selvage edge can be prepared using other techniques as well. For example, the selvage edge can be prepared mechanically (for example, by applying pressure without significant heat), chemically (for example, using a plasticizer to soften the material), and the like, as well as combinations thereof. Preferably at least one edge remains exposed so as to allow ready attachment of electrodes.

This can provide benefits in handling the carbon fiber sheet materials and allow faster fabrication rates when incorporating the carbon fiber sheets into an end product. This is particularly advantageous for carbon fiber tows and can add additional dimensional stability to the structure. In this aspect of the invention, the basis weight of the adhesive layer (for example an adhesive melt blown web) can be very low, from about 1 to about 20 gsm, and preferably from about 1 to about 10 gsm, and still provide the desired benefit.

Figure 4A:
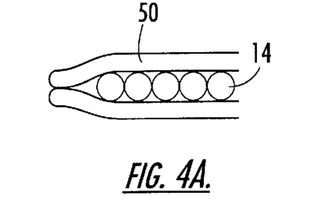
FIGS. 4A, 4B and 4C are schematic cross sectional views of exemplary carbon fiber sheet materials of the invention and illustrate various seam configurations.
Figure 4B:
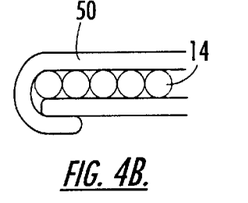
Figure 4C:
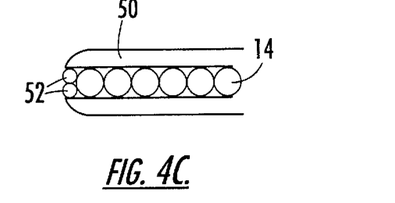

In this aspect of the invention, the carbon fiber sheet materials of the invention can include a variety of edge treatments along the longitudinal and optional transverse edges thereof. Examples of representative edge treatments are illustrated in FIGS. 4A, 4B and 4C. As shown in FIGS. 4A, opposing adhesive layers 50 can extend beyond the edge of the carbon fiber network (such as that illustrated in FIG. 1A including carbon filaments 14) and be treated as noted above to form a selvage. Alternatively, as illustrated in FIG. 4B, at least one of the adhesive layers 50 can actually overlap the edge of the carbon fiber network. This can occur, for example, when melt blowing or spraying the adhesive material onto the carbon fiber network.

FIG. 4C illustrates yet another alternative edge treatment. In this aspect of the invention, the carbon fiber assemblies of the invention can include one or more edging materials, such as yarns 52 formed of a low modulus polymer like polypropylene, polyethylene, nylon and the like. The edging material is positioned adjacent the longitudinal edge(s) of the carbon fiber network and can be useful in controlling the width of the carbon fiber network, particularly for those embodiments employing carbon fiber tows. Also, such edging materials can provide additional dimensional stability to the assembly. Still further, the edging material can be selected so as to be compatible and/or have affinity with the adhesive layer so as to improve bonding of the adhesive layer to the carbon fiber assembly (for example, by selecting a polyolefin based adhesive and a polyolefin yarn or polyolefin sheathed or coated yarn edging material).

In addition, the melt blown layer may be applied as a single layer or as multiple layers on a given surface of the carbon fiber network. For example, an initial layer of melt blown fibers may be applied directly onto a surface of the carbon fiber network, followed by application of a second layer of melt blown fibers onto the initial melt blown fiber layer. This allows tailoring the physical properties of the resultant melt blown web to provide the desired basis weight, porosity, and the like. This is particularly useful to provide a melt blown fibrous structure having a continuum of fiber sizes, and thus differential porosity, throughout the thickness of the melt blown webs. In this aspect of the invention, advantageously a layer of large diameter melt blown fibers (generally from about 20 to about 200 microns) can be applied initially to the carbon fiber structure. At least one additional layer of smaller diameter melt blown fibers (from about 5 to about 75 microns) can then be applied to the first melt blown web.

Figures 5, 6, 7:
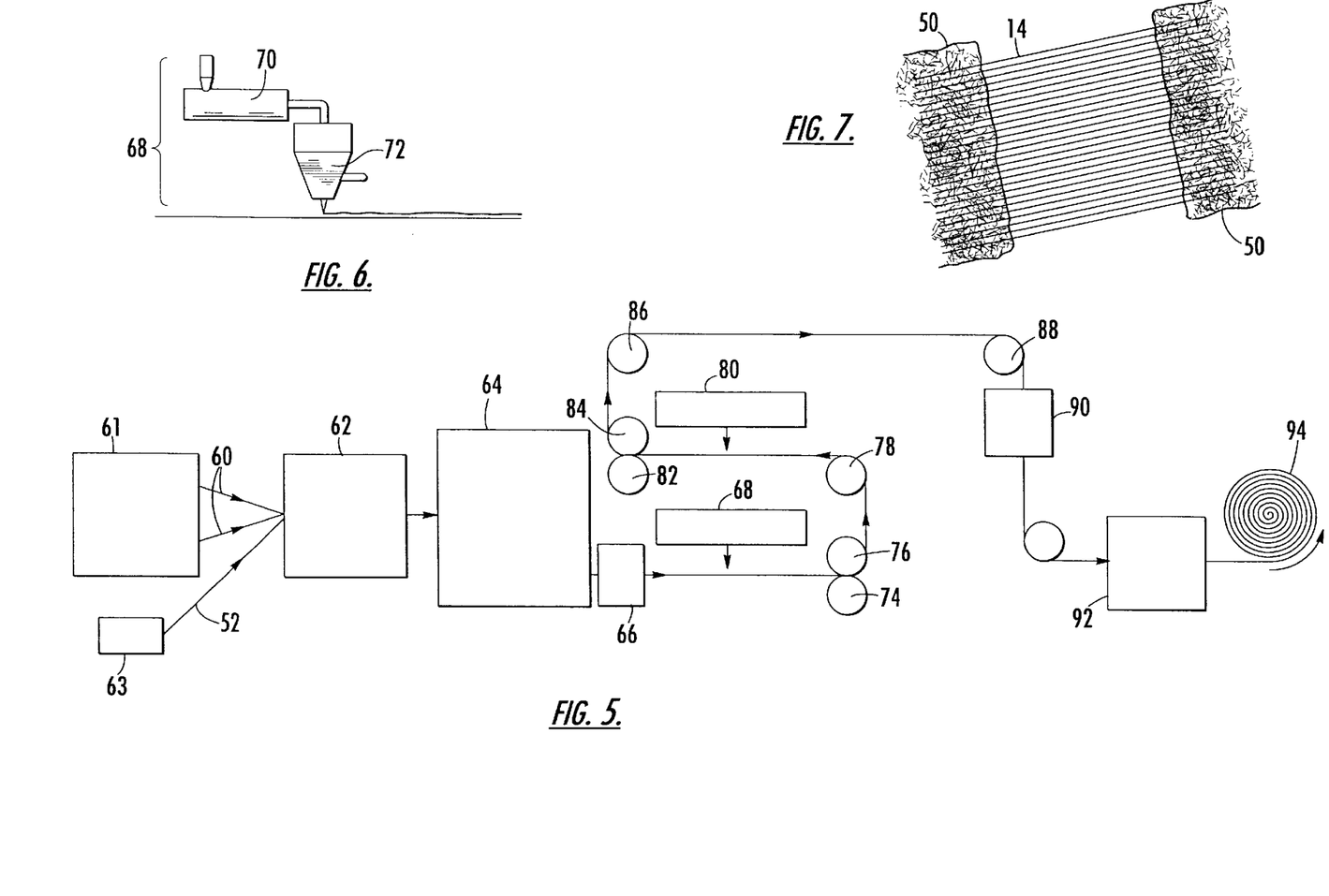
FIG. 5 schematically illustrates an exemplary method of making the carbon fiber sheet materials in accordance with one embodiment of the invention.
FIG. 6 schematically illustrates an exemplary method of forming the melt blown polymer web on one surface of the carbon fiber network.
FIG. 7 schematically illustrates an exemplary carbon fiber sheet material of the invention having an area of exposed carbon fibers between areas having an adhesive layer adhered to the carbon fibers.

FIG. 5 schematically illustrates an exemplary method for forming the carbon fiber networks of the invention. Specifically, FIG. 5 illustrates the application of the melt blown polymer web 50 directly onto a surface of a carbon fiber network 12 derived from a plurality of carbon fiber tows or bundles using a conventional melt blowing apparatus.

Although FIG. 5 illustrates application of a melt blown web to carbon fiber tows, the skilled artisan will appreciate that the method of the invention and in particular the melt blowing techniques as described herein are applicable for any of the woven, nonwoven and knit carbon fiber networks. Further, as noted above, the adhesive layer can be in other forms, such as other types of fibrous webs (such as a spunbonded web), a microporous film, a discontinuous pattern of adhesive, and the like. Adhesive fibrous webs may be pre-formed or applied in-line. A pattern of adhesive may be applied using conventional techniques, such as those using a doctor blade, gravere roll, and the like. In this aspect of the invention, the adhesive can be applied in any pattern, including swirls, dots, stripes, etc., so long as the resultant adhesive layer is permeable. Microporous films are also useful and are known in the art.

Turning to FIG. 5, several carbon fiber bundles 60 are conveyed in from a creel 61 or other suitable feeding device to a web orientation and spreading station 62. The number of carbon fiber bundles can vary, depending upon factors such as the desired dimensions of the carbon fiber sheet, weight, etc. The web orientation and spreading station 62 can be any of the types of apparatus as known in the art for substantially uniformly spreading the carbon fiber bundles to form a substantially planar sheet, such as but not limited to grooved rolls, combs, nip rollers, and the like. Width of the carbon fibers can also be controlled using conventional apparatus.

Optionally edging materials such as a polymeric yarn 52 as described above, can be directed from a suitable feeding device 63 in the longitudinal direction and adjacent one or both longitudinal edges of the carbon fiber network.

The substantially planar sheet of carbon fibers is next optionally directed to a cleaning station 64 to remove sizing or other coatings that may be present on the carbon fiber surfaces. Such coatings can be removed using conventional techniques. For example, the carbon fibers can be washed using an aqueous bath, thermally treated, and the like. Cleaning systems as known in the art include without limitation water washers, scouring treaters, convection ovens, radiant ovens, FR ovens, and the like. Similar types of cleaning processes and apparatus can also be employed for other carbon fiber network structures.

After exiting the cleaning station 64, the carbon fiber sheet can be directed through a suitable device for measuring the carbon fiber sheet thickness as well as uniformity of thickness. In this regard, a conventional gamma or beta gauge 66 can be employed and set to scan the sheet across its width as the sheet continuously travels in a longitudinal direction and to take one reading per unit of sheet material scanned (i.e., about 1 inch apart) such that the gamma gauge measures thickness both across the width and along the length of the moving sheet. In an exemplary technique, the thickness of the carbon fiber sheet is measured at about 5 locations (although fewer or more locations can be used) continually spaced about ½ to about 4 inches apart across the width of the sheet using a conventional continually transversing gamma or beta gauge, and repeated several times per minute along the length of the sheet.

Next the carbon fiber sheet material is directed to a melt blowing apparatus 68. Melt blowing apparatus are known to the skilled artisan and are disclosed, for example, in U.S. Pat. No. 3,849,241 to Buntin et al. and U.S. Pat. No. 4,048,364 to Harding et al. An exemplary melt blowing apparatus 68 is illustrated in FIG. 6. As shown, the melt blowing process involves supplying polymeric pellets or other polymer materials to a melting apparatus such as an extruder 70, melting the molten polymeric material in the melting apparatus, and pumping it to melt blowing heads 72. The filamentary streams exit the heads 72 where high velocity converging streams of a heated gas, typically air, are supplied from nozzles. The converging streams of high velocity heated gas attenuate the polymer streams and deposit the same on the surface of the carbon fiber network. The fibers are randomly oriented and together form the melt blown polymer web 50. Alternatively, an adhesive material can be melted and pumped to the melt blowing heads or other suitable spraying device without requiring an extruder.

Melt blowing or spraying the adhesive material can provide increased control of the in-line adhesive application process, and as a result allow better control of the amount of adhesive applied, coverage of the adhesive layer across the surface of the carbon fiber network and the like. For example, the spraying process can be stopped as desired while the sheet material continues to move, creating areas of exposed carbon fibers without an adhesive material. FIG. 7 schematically illustrates an exemplary carbon fiber sheet material which includes areas of exposed carbon fibers between adhesive melt blown webs. This can be advantageous also when making materials for battery applications, because typically at least a portion of the adhesive layer is removed prior to use so as to connect the carbon fibers in a battery cell. This can result in time savings as well as minimize damage to the carbon fibers which can result from removing the adhesive material.

Once the melt blown polymer web 50 has been formed on the surface of the carbon fiber network, the melt blown web/carbon fiber network may be directed as indicated by the arrows through the nip formed by guide rolls 74 and 76 and across guide roll 78 to a second melt blowing apparatus 80. Here another layer of melt blown fibers can be deposited onto an opposing surface of the carbon fiber network. Although not illustrated, a series of melt blowing apparatus can also be; used to deposit more than one melt blown web onto the same surface of the carbon fiber network. Rolls 74, 76 and 78 can also be adjusted to provide the desired degree of tension on the network. As will be appreciated by the skilled artisan, the exact number and position of guide rolls can be varied and are within the knowledge of the skilled artisan.

After depositing the melt blown web(s) onto one or both surfaces of the carbon fiber sheet, the resultant melt blown web/carbon fiber sheet material is directed via guide rolls 82, 84, 86 and 88 through another optional gamma or beta gauge 90 and through an optional thermal treatment station 92. As discussed above, the melt blown web(s) can extend beyond one or more edges of the carbon fiber network. In this aspect of the invention, the melt blown web is treated with thermal energy under conditions sufficient to fuse at least a portion of the melt blown fibers that extend beyond the edge(s) of the carbon fiber network to form a thermal bond or selvage. Although thermal treatment is illustrated, a selvage edge can be formed using other techniques known in the art. For example, the selvage edge can be prepared mechanically (for example, by applying pressure without significant heat), chemically (for example, using a plasticizer to soften the material), and the like, as well as combinations thereof.

Advantageously the melt blown web(s) are wider than the carbon fiber network in the cross machine direction, e.g. at least a portion of the melt blown web(s) extend beyond both longitudinal edges of the carbon fiber network. The melt blown webs can be thermally treated to form seams adjacent opposite edges of the carbon fiber assembly that are substantially parallel to one another and parallel to the lengthwise or machine direction of the carbon fiber network. The seams can vary in size, and typically range from about ¹⁄₆₄ to about ½ inch wide. The seams can be formed sequentially, e.g., by thermally bonding excess melt blown web along one longitudinal edge of the assembly, and then thermally bonding the opposite edge, or the seams can be formed simultaneously.

For battery applications, the carbon fiber sheet material can be further processed in line or in a subsequent process to provide the desired shape and size sheet material for a given system. Typically for battery applications, at least one edge (typically in the cross machine direction) of the carbon fiber sheet material is free of melt blown material so that a current or electron collector can be connected to the carbon fibers, as described below. The length of carbon fibers exposed or free of melt blown adhesive can vary, and typically ranges from about ⅛ to about ⅜ inch. An opposing cross machine edge can be bonded, using a seam similar to that described above along the longitudinal edges of the material, by thermally bonding excess melt blown material. Alternatively other stabilizing means, such as a strip of a hot melt adhesive, can be applied along this edge.

The thermal treatment conditions used can vary depending upon the polymer composition of the melt blown fibers and can be readily determined by the skilled artisan. Thermal treatment station 92 can be constructed in a manner as known in the art and can include thermal bonding rolls. Other thermal treatment stations such as ultrasonic, microwave or other RF treatment zones which are capable of bonding the melt blown fibers can also be used.

The sheet material can be treated (thermally or otherwise) along the edges thereof, across the surface of the sheet material, or both, to improve bonding of the adhesive layer to the carbon fibers. For example, the overall surface of the sheet material can be substantially continuously treated, for example by passing the sheet through cooperating smooth rolls. Alternatively the surface of the sheet material can be treated in a discontinuous manner to form a plurality of spot bonds, for example, by passing the sheet material through heated rolls with raised pins to increase bonding at discrete locations across the surface of the sheet.

The resultant carbon fiber assembly exits the thermal treatment station 92 and is wound up by conventional means on roll 94. Alternatively the carbon fiber assembly can be directed to additional downstream processing. For example, the carbon fiber assemblies can be cut into the desired shapes and dimensions for a particular end use and stacked.

The method illustrated in FIGS. 5 and 6 is susceptible to numerous variations. For example, additional webs can be employed in the invention. In one aspect of the invention, a scrim (such as an open mesh scrim) material having a plurality of intersecting generally transverse and generally longitudinal glass yarns is joined to one or both opposing surfaces of the carbon fiber sheet material. Preferably the intersecting yarns of the scrim are bonded at their cross over points using a polymeric binder to provide dimensional stability to the scrim. A polymer web, such as the melt blown adhesive webs described above, is optionally present along one or both surfaces of the scrim as well. See U.S. Pat. No. 6,054,205, issued Apr. 25, 2000, incorporated herein by reference, for a more detailed description of open mesh scrims useful in this aspect of the invention.

The scrim can be joined to the carbon fiber network adjacent an exposed surface of the adhesive melt blown web so as to sandwich the adhesive layer between the scrim and the carbon fiber network to form a scrim/adhesive melt blown web/carbon fiber network assembly. When melt blown webs are present along both surfaces of the carbon fiber network, a scrim can be joined to each of the exposed melt blown web surfaces to form a scrim/adhesive melt blown web/carbon fiber network/adhesive melt blown web/scrim assembly. This can provide additional stability to the structure, particularly for carbon fiber sheets formed from a carbon fiber tow.

As will be apparent, the scrims can be formed from or include yarns of various orientations in place of or in addition to the generally transverse and generally longitudinal weft and warp yarns, including diagonally oriented yarns, randomly oriented yarns, and yarns in a 0°/60°/120° orientation, which intersect and are preferably bonded at their crossover points. The scrim can also be prepared using the process and apparatus of U.S. Pat. No. 4,242,779 to Curinier et al., referenced above.

Alternatively, other fabric structures, including other woven, nonwoven and knit fabrics, can also be joined to the carbon fiber network adjacent a surface of the melt blown web(s). For example, the carbon fiber sheet materials of the invention can be affixed to a spunbonded or melt blown web formed of a thermoplastic polymeric material, advantageously a polyolefin such as polypropylene.

The one or more additional sheet materials can be affixed to the carbon fiber assembly by directing the additional sheet material (e.g., scrim, nonwoven sheet, etc.) into a face-to-face cooperating relationship with the melt blown adhesive surface. The additional sheet can be adhered to the carbon fiber sheet material via the adhesive nature of the melt blown web(s). Alternatively the assembly can be heated to soften the melt blown adhesive web and pressure applied as necessary (for example by passing the laminate through the nip formed by cooperating heated pressure rolls) to enhance bonding. For battery applications, the additional sheet materials should also have the properties of ion permeability and non-conductivity.

The resultant carbon fiber sheet materials of the invention are useful in a variety of applications, and are particularly useful as electrodes in battery applications. Reference is made, for example, to the batteries described in U.S. Pat. Nos. 4,865,931; 5,518,836; 4,830,938; 4,952,466; and 4,929,521. The carbon fiber sheet materials of the invention are useful in any of the types of electrical energy storage devices described therein.

For example, a typical secondary battery will include a housing with a generally rectangular or prismatic configuration, although other shaped or configurations can also be used. For example, the housing of the battery can consist of an air and water vapor impervious polymer or a metal/plastic laminate that can be molded or pressed into any desired shape to form a housing which could then be inserted into or form the roof, door, or floor panel of an automobile, the wall or panel of a portable computer, etc.

A pair of generally planar electrodes, constructed as described above, are positioned in a chamber of the battery housing in a facing relationship, with the melt blown web(s) positioned between the electrodes to prevent short circuiting between the electrodes while permitting ions to travel between the electrodes.

The electrodes are provided on at least one edge (when the electrodes are generally rectangular in shape) of the electrode body with a current or electron collector such as is illustrated, for example in U.S. Pat. No. 4,830,938 or U.S. Pat. No. 4,631,118. Other methods beyond the scope of these above two references for depositing a copper, nickel or other conductive metal current collector on the edge of the electrode such as by electroless plating, plasma or vacuum vapor deposition, and the like, can also be employed. An electrically conductive terminal is connected to the current collector at any suitable position along the length of the current collector such as, for example, at one end or at a mid-portion thereof.

The housing contains an electrolyte. The electrolyte employed in the secondary battery of the invention is generally a mixture of an ionizable salt dissolved in a non aqueous, liquid or paste. Exemplary solvents are known in the art and include compounds having oxygen, sulfur, and/or nitrogen atoms bound to carbon atoms in an electrochemically non-reactive state. Preferred solvents include nitrites such as acetonitrile; amides, such as dimethyl formamide; ethers, such as tetrahydrofuran; sulfur compounds, such as dimethyl sulfite, and other compounds such as propylene carbonate, ethylene carbonate, or various blends of the above mentioned solvents. Ionizable salts useful in the invention are also known in the art and include salts of the more active metals, such as, for example, the alkali metal salts, preferably lithium, sodium or potassium, or mixtures thereof containing stable anions such as perchlorate ($ClO_4^-$), ($CF_3SO_3^-$), tetrafluoroborate ($BF_4^-$), hexafluoroarsenate ($AsF_6^-$), hexafluoroantimonate ($SbF_6^-$), hexafluorophosphate ($PF_6^-$), and the like.

Preferably the electrolyte (solvent and salt) is substantially water-free, that is, contains less than about 20 ppm of water, preferably less than 10 ppm water, and more preferably less than 1 ppm. If the electrolyte contains more than the desired amount of water, it can be dried as for example, over an activated zeolite molecular sieve. Such a drying agent can also be introduced into the finished battery to ensure that the level of water does not exceed the ability of the cathode to neutralize the free hydroxyl ions that may be present in the electrolyte. The electrolyte should also be such as to permit ions (anions and cations) of the ionizable salt to move freely through the solvent as the electrical potential of charge and discharge move the ions to and from their respective poles (electrodes).

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A carbon fiber sheet material comprising:
   a network comprising a plurality of substantially parallel carbon fibers;
   a first adhesive melt blown web adhered to at least one surface of said carbon fiber network; and
   a second adhesive melt blown web releasably adhered to a surface of said first melt blown web.

2. The carbon fiber sheet material of claim 1, wherein each of said first and second melt blown webs comprises a plurality of melt blown fibers, and wherein the melt blown fibers of said first melt blown web have an average diameter that is larger than the average diameter of the melt blown fibers of said second melt blown web.

3. A carbon fiber sheet material comprising:
   a network comprising a plurality of substantially parallel carbon fibers;
   a first permeable adhesive layer adhered to at least one surface of said carbon fiber network; and
   a second permeable adhesive layer adhered to a surface of the carbon fiber network opposite the surface to which the first permeable adhesive layer is adhered,
   wherein each of said permeable adhesive layers extend beyond at least one edge of said carbon fiber network, and wherein a portion of the permeable adhesive layers extending beyond the edge of the carbon fiber network is treated to form a selvage edge.

4. The carbon fiber sheet material of claim 3, wherein said portion of the permeable adhesive layers extending beyond the edge of the carbon fiber network is thermally, chemically or mechanically treated, or a combination thereof, to form a selvage edge.

5. The carbon fiber sheet material of claim 3, wherein each of said first and second permeable adhesive layers are releasably adhered to said carbon fiber network.

6. A carbon fiber sheet material useful as an electrode in an electrical energy storage device, comprising:
   a plurality of carbon fibers substantially uniformly aligned and spread out relative to one another to form a planar sheet;
   a first adhesive melt blown web adhered to at least one surface of said planar sheet; and
   at least one additional adhesive melt blown web adhered to a surface of the planar sheet opposite the surface to which the first permeable adhesive melt blown web is adhered, wherein said melt blown webs extend beyond at least one edge of said planar sheet and wherein a portion of the melt blown webs extending beyond the edge of said planar sheet is treated to form a selvage edge.

7. The carbon fiber sheet material of claim 6, wherein said portion of the melt blown webs extending beyond the edge of the carbon fiber network is thermally, chemically or mechanically treated, or a combination thereof, to form a selvage edge.

8. The carbon fiber sheet material of claim 7, wherein each of said first and second adhesive melt blown webs are releasably adhered to said carbon fiber network.

9. A carbon fiber sheet material comprising:
   a network comprising a plurality of substantially parallel carbon fibers;
   a permeable adhesive layer adhered to at least one surface of said carbon fiber network;
   and at least one additional layer adjacent said permeable adhesive layer positioned to sandwich said adhesive layer between said carbon fiber network and said additional layer, wherein said additional layer is an open mesh scrim.

10. The carbon fiber sheet material of claim 9, wherein said carbon fiber network comprises a plurality of carbon fibers substantially uniformly aligned and spread out relative to one another to form a planar sheet and said permeable adhesive layer is an adhesive melt blown web.

11. The carbon fiber sheet material of claim 10, further comprising a second adhesive melt blown web adhered to a surface of the carbon fiber network opposite said first melt blown web and a second open mesh scrim positioned to sandwich said second adhesive melt blown web between said carbon fiber network and said second open mesh scrim.

12. A carbon fiber sheet material useful as an electrode in an electrical energy storage device, comprising:
   a plurality of carbon fibers substantially uniformly aligned and spread out relative to one another to form a planar sheet;
   an adhesive melt blown web adhered to at least one surface of said planar sheet; and
   at least one additional layer adjacent said permeable adhesive layer positioned to sandwich said adhesive layer between said planar sheet and said additional layer,
   wherein said additional layer is an open mesh scrim.

13. The carbon fiber sheet material of claim 12, further comprising a second adhesive melt blown web adhered to a surface of the carbon fiber network opposite said first melt blown web and a second open mesh scrim positioned to sandwich said second adhesive melt blown web between said carbon fiber network and said second open mesh scrim.

14. A carbon fiber sheet material useful as an electrode in an electrical energy storage device, comprising:
   a nonwoven carbon fiber fabric having a plurality of generally longitudinal carbon fiber yarns and a plurality of generally transverse polyolefin coated fiberglass yarns bonded at their crossover points by said polyolefin coating to provide dimensional stability;
   an adhesive melt blown web adhered to said carbon fiber fabric on at least one surface thereof; and
   at least one additional layer adjacent said permeable adhesive layer positioned to sandwich said adhesive layer between said carbon fiber network and said additional layer, wherein said additional layer is an open mesh scrim.

15. The carbon fiber sheet material of claim 14, further comprising a second adhesive melt blown web adhered to a surface of the carbon fiber network opposite said first melt blown web and a second open mesh scrim positioned to sandwich said second adhesive melt blown web between said carbon fiber network and said second open mesh scrim.

16. The carbon fiber sheet material of claim 15, wherein each of said first and second adhesive melt blown webs are releasably adhered to said carbon fiber network.

* * * * *